Patented Oct. 23, 1945

2,387,341

UNITED STATES PATENT OFFICE 2,387,341

BROMINATION OF 2,6-NITRO CHLOR TOLUENE

James Ogilvie, Buffalo, N. Y., assignor to Allied Chemical & Dye Corporation, New York, N. Y., a corporation of New York No Drawing. Application July 7, 1942, Serial No. 450,077

11 Claims. (Cl. 260—646)

This invention relates to an improved process for brominating nuclearly substituted toluenes to prepare the corresponding benzyl bromides. More particularly the invention relates to a process for direct bromination of 2,6-nitro chlor toluene to produce 2,6-nitro chlor benzyl bromide.

German Patent 107,501 to Janson discloses preparation of 2,6-nitro chlor benzyl bromide by reacting somewhat more than an equimolecular quantity of bromine with 2,6-nitro chlor toluene at a temperature between 160° and 180° C. It is disclosed that the bromination temperature should not be permitted to fall below 150° C. since at such temperatures other bromination products which apparently contain the bromine in the toluene nucleus are formed.

It has been found that the Janson process, when carried out on a laboratory scale, requires exceedingly careful control since the reaction, carried out under the conditions of that process is accompanied by decomposition and side reactions, which are evidenced by excessive foaming, and by a tendency for the reaction to become explosively violent. The reaction product generally becomes contaminated with tar and other by-products, necessitating purification before further processing can be undertaken; and despite Janson's allegation that by his process he can obtain nearly theoretical yields of 2,6-nitro chlor benzyl bromide, careful experimental trials of his method have demonstrated that poor yields are generally obtained. Attempts to carry out this process on a commercial scale with relatively large amounts of reagents have failed because of the substantially insuperable difficulty of avoiding the danger of explosion, which is complicated by the highly irritant nature of the bromination products.

Gindraux, in Helvetica Chimica Acta 12, 931 (1929) discloses a modification of the Janson process differing therefrom chiefly in that ortho-dichlor benzol is included as an inert solvent in the reaction mixture. The 2,6-nitro chlor benzyl bromide, which is produced, is separated from the inert solvent in the reaction mixture by fractional distillation in vacuo, such separation being necessary, for instance, in order to effect satisfactory hydrolysis of the bromide to the corresponding benzyl alcohol. This process is unsuitable for commercial operation because it necessitates a costly and inconvenient separation of 2,6-nitro chlor benzyl bromide from the inert solvent in the reaction mixture by a vacuum distillation which on a commercial scale is hazardous, and moreover is inconvenient because of the highly corrosive irritant and lachrymatory nature of the constituents of the mixture.

Contrary to the disclosure of German Patent 107,501 that bromine reacts with 2,6-nitro chlor toluene at temperatures below 150° C. to form nuclear brom derivatives, I have made the surprising discovery that 2,6-nitro chlor toluene can be directly brominated in a smooth and efficient manner to produce the corresponding substituted benzyl bromide with substantially no nuclear bromination of 2,6-nitro chlor toluene, by reaction with bromine, at a temperature within the limits from about 120° to about 150° C., preferably from 130° to 150° C., and particularly from 130° to 135° C. until not substantially more than 50% of the 2,6-nitro chlor toluene is brominated, or so that not substantially less than about half of the 2,6-nitro chlor toluene remains unreacted, bromination being thereupon terminated. Accumulation of substantial amounts of unreacted bromine in the reaction mixture is preferably prevented, and is readily avoided, for, at temperatures within the aforesaid range, the bromination of 2,6-nitro chlor toluene to 2,6-nitro chlor benzyl bromide proceeds at a slow rate, while excess bromine vaporizes rapidly and leaves the mixture. When about half of the 2,6-nitro chlor toluene charge has been brominated to 2,6-nitro chlor benzyl bromide the rate of bromination of the remaining 2,6-nitro chlor toluene, at the aforesaid temperatures is so slow that additional free bromine in the mixture evaporates before it can react to form an appreciable amount of additional brominated product. If bromination is continued after about 50 per cent of the 2,6-nitro chlor toluene charge is brominated, the rate of decomposition of products in the reaction mixture accelerates to a noticeable extent and becomes evident by increasing formation of tarry products.

In the process of my invention, the bromination is carried out by reacting a quantity of 2,6-nitro chlor toluene with bromine, preferably by adding the bromine gradually to the 2,6-nitro chlor toluene, while maintaining the reaction mixture at a temperature within the aforesaid range, at such a rate that the bromine is almost immediately consumed by the reaction substantially as fast as it is added, until the quantity of bromine added is approximately half of the amount theoretically required to effect 100% monobromination of the 2,6-nitro chlor toluene. Under these conditions, particularly at temperatures within the preferred range, I have found that addition of about 0.6 mol of bromine per mol of 2,6-nitro chlor toluene is sufficient, especially in commercial application of the process, to effect substantially 50% monobromination of the charge of 2,6-nitro chlor toluene to 2,6-nitro chlor benzyl bromide. Preferably, approximately one-half mol of bromine, e. g. from about 0.5 to about 0.55 mol, is added to one mol of the 2,6-nitro chlor toluene. The presence of any substantial amount of free bromine in the liquid reaction mixture and consequent waste of bromine are thus avoided during the entire reaction.

The reaction proceeds without the excessive foaming, decomposition, tar formation, or violent side reactions, which result in the explosion hazard and other disadvantages of the Janson process; and the liquid reaction product, which consists mainly of the unreacted 2,6-nitro chlor toluene mixed with the corresponding benzyl bromide, is sufficiently pure to be subjected directly to further processing. For instance, the resulting reaction mixture may be hydrolyzed without preliminary treatment to convert the bromide to the corresponding benzyl alcohol by boiling it with an aqueous alkaline solution, e. g., a 10% solution of sodium carbonate. The 2,6-nitro chlor benzyl bromide contained in the reaction product is hydrolyzed thereby to 2,6-nitro chlor benzyl alcohol, which remains in the aqueous portion of the hydrolysis mixture, and separates out as a solid therefrom upon cooling. It may be recovered, for instance, by filtration, in a form suitable without further purification for oxidation to the corresponding aldehyde. The unreacted 2,6-nitro chlor toluene contained in the mixture does not interfere with the hydrolysis; it may be simultaneously distilled from the hydrolysis mixture together with steam, and upon condensing the vapor it may be separated from the aqueous fraction of the condensate and returned, if desired, for re-use in the bromination process.

The yield of 2,6-nitro chlor benzyl bromide based on the amount of 2,6-nitro chlor toluene consumed is almost quantitative. For example, 2,6-nitro chlor benzyl alcohol may be obtained by hydrolysis of the bromination product of 2,6-nitro chlor toluene in yields of the order of 90% of theory based on the amount of unrecovered 2,6-nitro chlor toluene.

The process of this invention may be readily applied for commercial bromination of 2,6-nitro chlor toluene to 2,6-nitro chlor benzyl bromide in batches of any desired size, and requires no special reaction equipment such as that used in continuous processes.

The invention will be more clearly understood from the following example in which parts are by weight and temperatures are in degrees centigrade. However, it is pointed out that the details thereof are not to be interpreted in a limiting sense but are merely illustrative since numerous variations will be apparent to those skilled in the art.

*Example*

171 parts (1 mol) of 2,6-nitro chlor toluene (M. P. 34°) are heated to a temperature between 130° and 135°. The molten material is agitated and 88 parts (0.55 mol) of bromine are added drop-wise, with continuous agitation, over a period of about 8 to about 10 hours, the temperature being constantly maintained between 130° and 135°. The liquid reaction product thus obtained consists mainly of 2,6-nitro chlor benzyl bromide and unreacted 2,6-nitro chlor toluene.

In order to convert the 2,6-nitro chlor benzyl bromide to the corresponding alcohol, the reaction mixture may be poured into 700 parts of a 10% aqueous solution of sodium carbonate and the resulting mixture boiled under reflux for about 10 hours. Unreacted 2,6-nitro chlor toluene which distills off with steam from the refluxing mass may be condensed together with the steam and separated from the condensate as a non-aqueous phase in a continuous separator. The aqueous phase of the condensate is preferably returned to the reaction mass, while the recovered 2,6-nitro chlor toluene may be returned to the bromination process if desired. In this manner about 85 parts of 2,6-nitro chlor toluene are recovered. Upon cooling the residual aqueous mixture to about 15 to 20°, filtering, and drying the solid crystalline filter cake, thus obtained, at low temperature, 84.5 parts of 2,6-nitro chlor benzyl alcohol having a melting point of 58° to 59° are obtained. This yield is equivalent to 90% of the theoretical yield obtainable from the unrecovered 2,6-nitro chlor toluene.

While halogenation catalysts, such as phosphorus, phosphorous trichloride, and the like may be included in the bromination mixture, their presence is preferably avoided since in some cases they tend to promote formation of tar and other side reactions.

Variations and modifications may be made within the scope of the invention and the process thereof is not limited to the procedural details hereinbefore described.

I claim:

1. In a process for the production of 2,6-nitro chlor benzyl bromide by bromination of 2,6-nitro chlor toluene, the improvement which comprises treating 2,6-nitro chlor toluene with bromine, at a temperature within the limits from about 120° to about 150° C., and terminating the treatment with bromine upon bromination of about 50% of the 2,6-nitro chlor toluene.

2. In a process for the production of 2,6-nitro chlor benzyl bromide by bromination of 2,6-nitro chlor toluene, the improvement which comprises treating a quantity of 2,6-nitro chlor toluene with bromine at a temperature within the limits from about 120° to about 150° C., and terminating the treatment with bromine while not substantially more than half of said quantity of 2,6-nitro chlor toluene is brominated.

3. In a process for the production of 2,6-nitro chlor benzyl bromide by bromination of 2,6-nitro chlor toluene, the improvement which comprises treating 2,6-nitro chlor toluene with bromine at a temperature within the limits from about 120° to about 150° C. and maintaining, throughout the bromination, not substantially less than about one-half of said 2,6-nitro chlor toluene in unreacted form.

4. In a process for the production of 2,6-nitro chlor benzyl bromide by bromination of 2,6-nitro chlor toluene, the improvement which comprises treating a molar quantity of 2,6-nitro chlor toluene with not substantially more than 0.6 mol of bromine, at a reaction temperature within the limits from about 120° to about 150° C.

5. In a process for the production of 2,6-nitro chlor benzyl bromide by bromination of 2,6-nitro chlor toluene, the improvement which comprises adding not substantially more than 0.6 mol of bromine to one mol of 2,6-nitro chlor toluene at a temperature within the limits from about 120° to about 150° C., at such a rate that the bromine is consumed by reaction with the 2,6-nitro chlor toluene substantially as fast as it is added thereto.

6. In a process for the production of 2,6-nitro chlor benzyl bromide by bromination of 2,6-nitro chlor toluene, the improvement which comprises treating a quantity of 2,6-nitro chlor toluene with bromine at a temperature within the limits of 130° to 150° C. while preventing accumulation of substantial amounts of unreacted bromine in the liquid reaction mixture, and terminating the treatment with bromine while not substantially more than half of said quantity of 2,6-nitro chlor toluene is brominated.

7. In a process for the production of 2,6-nitro chlor benzyl bromide by bromination of 2,6-nitro chlor toluene, the improvement which comprises adding approximately one-half mol of bromine to one mol of 2,6-nitro chlor toluene at a temperature within the limits of 130° to 135° C., at such a rate that the bromine is consumed by reaction with the 2,6-nitro chlor toluene substantially as fast as it is added thereto.

8. In a process for the production of 2,6-nitro chlor benzyl bromide by bromination of 2,6-nitro chlor toluene, the improvement which comprises gradually adding from about 0.5 to about 0.55 mol of bromine to 1 mol of 2,6-nitro chlor toluene over a period of about 8 to about 10 hours at a temperature within the limits of 130° to 135° C.

9. The process which comprises treating a quantity of 2,6-nitro chlor toluene with bromine at a temperature within the limits from about 120° to about 150° C., terminating the treatment with bromine while not substantially more than half of said quantity of 2,6-nitro chlor toluene is brominated, subjecting the resulting liquid reaction mixture to a hydrolyzing treatment to convert the 2,6-nitro chlor benzyl bromide contained therein to the corresponding alcohol and simultaneously distilling the unreacted 2,6-nitro chlor toluene from the hydrolysis mixture, and returning said unreacted 2,6-nitro chlor toluene for reuse to the bromination process.

10. The process which comprises treating a quantity of 2,6-nitro chlor toluene with bromine at a temperature within the limits from about 120° to about 150° C. while preventing accumulation of substantial amounts of unreacted bromine in the liquid reaction mixture, terminating the treatment with bromine while not substantially more than one-half of said quantity of 2,6-nitro chlor toluene is brominated, subjecting the resulting liquid reaction mixture to a hydrolyzing treatment by boiling with an aqueous alkaline solution to convert the 2,6-nitro chlor benzyl bromide contained therein to 2,6-nitro chlor benzyl alcohol and simultaneously recovering unreacted 2,6-nitro chlor toluene from the vapors issuing from the hydrolysis mixture, and returning said unreacted 2,6-nitro chlor toluene for reuse to the bromination process.

11. The process which comprises gradually adding from about 0.5 to about 0.55 mol of bromine to one mol of 2,6-nitro chlor toluene over a period of about 8 to about 10 hours at a temperature within the limits 130° to 135° C., hydrolyzing the resulting liquid reaction mixture by boiling it with an aqueous alkaline solution to convert the 2,6-nitro chlor benzyl bromide contained therein to 2,6-nitro chlor benzyl alcohol, condensing the vapors issuing from the hydrolysis mixture, recovering unreacted 2,6-nitro chlor toluene from the resulting condensate, and returning said unreacted 2,6-nitro chlor toluene for reuse to the bromination process.

JAMES OGILVIE.